United States Patent
Bailey et al.

(10) Patent No.: US 7,485,066 B2
(45) Date of Patent: Feb. 3, 2009

(54) GEARED TORQUE CONVERTER WITH MULTI-PLATE CLUTCHES AND PLANETARY GEARSET

(75) Inventors: George Bailey, Wooster, OH (US); Michael Davis, Wooster, OH (US); Philip George, Wooster, OH (US); Jeffrey Hemphill, Copley, OH (US); Patrick Lindemann, Wooster, OH (US); David Smith, Wadsworth, OH (US); Michael G. Swank, Shreve, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 368 days.

(21) Appl. No.: 11/494,216

(22) Filed: Jul. 27, 2006

(65) Prior Publication Data
US 2007/0037659 A1 Feb. 15, 2007

Related U.S. Application Data

(60) Provisional application No. 60/707,226, filed on Aug. 10, 2005.

(51) Int. Cl.
*F16H 3/44* (2006.01)
(52) U.S. Cl. .................. 475/269; 475/312; 192/55.61; 192/87.12
(58) Field of Classification Search ............. 475/269, 475/296, 346, 312
See application file for complete search history.

(56) References Cited

U.S. PATENT DOCUMENTS

| 4,610,181 | A | 9/1986 | Houley et al. |
|---|---|---|---|
| 5,019,022 | A | 5/1991 | Uhlig et al. |
| 5,628,703 | A | 5/1997 | Roeper |
| 5,836,849 | A | 11/1998 | Mathiak et al. |
| 5,846,153 | A | 12/1998 | Matsuoka |
| 6,406,400 | B1 | 6/2002 | Shih |
| 6,468,176 | B1 | 10/2002 | Antonov |
| 6,758,786 | B2 * | 7/2004 | Lepelletier .................. 475/296 |
| 6,849,024 | B2 | 2/2005 | Hayashi et al. |
| 2002/0007997 | A1 | 1/2002 | Kundermann |

FOREIGN PATENT DOCUMENTS

| DE | 3431 485 | 8/1984 |
|---|---|---|
| DE | 10205767 | 8/2003 |
| EP | 1 009 943 | 9/1997 |
| EP | 1203899 | 5/2002 |

* cited by examiner

*Primary Examiner*—Sherry L Estremsky
*Assistant Examiner*—Edwin A Young
(74) *Attorney, Agent, or Firm*—Simpson & Simpson, PLLC

(57) ABSTRACT

The present invention is a device for transferring power flow from a multidisplacement engine to a transmission. The device includes an enclosed housing having a first shell on the engine side, a second shell on the transmission side, with the housing at least partially filled with oil and connected to an external oil pump. The device also includes a planetary gear set comprising an outer ring gear, a set of intermediate planet gears contained within a planet carrier, and a sun gear attached to a stator, a first clutch pack connecting the housing and the ring gear when engaged, a piston means designed to engage the first clutch pack, and a second clutch pack which connects the ring gear with the sun gear when engaged. A preloaded diaphragm spring connects the second clutch pack with the ring gear. First and second damper spring assemblies are also disclosed.

26 Claims, 3 Drawing Sheets

GEARED TORQUE CONVERTER WITH MULTI-PLATE CLUTCHES AND PLANETARY GEARSET

CROSS REFERENCE TO RELATED APPLICATIONS

This patent application claims the benefit under 35 U.S.C. §119(e) of U.S. Provisional Application No. 60/707,226, filed Aug. 10, 2005, which application is incorporated herein by reference.

FIELD OF THE INVENTION

The present invention relates to torque converters. Specifically, the present invention relates to torque converters having dual multi-plate clutches. More specifically, the present invention relates to torque converters having a dual damper system and designed to operate in conjunction with multidisplacement or cylinder shut-off engines.

BACKGROUND OF THE INVENTION

New vehicle multidisplacement or cylinder shut off engines are now in development and in some cases in production. These engines are essentially designed to shut off one-half of the number of cylinders when operated in slow speed or idling situations in which the power output of all the cylinders is not needed. In slow speed situations, this shut off capability results in higher overall gas mileage as, for example, an eight cylinder engine consumes fuel at a four cylinder rate. Multidisplacement engines can be eight cylinders shutting off four cylinders, six cylinders shutting off three cylinders, ten cylinders shutting off five cylinders, etc. In the discussion below, an eight cylinder multidisplacement engine is described, but it should be realized that the same discussion will apply to all multidisplacement engines.

One problem presented by multidisplacement engines is the need to quickly supply an adequate power flow or torque flow from the engine to the transmission. By power or torque flow is meant the direction of movement of rotational power from the engine to the transmission. In contrast to standard engines that always utilize all the cylinders, multidisplacement engines use only half the total number of cylinders when at idle or very slow speeds. Consequently, one problem presented by the multidisplacement engines is the need to establish a quick increase in power flow when moving from an idle to running condition.

It is well known to insert a torque converter between an internal combustion engine and an automatic transmission to increase the torque supplied to the transmission which allows for efficient starts from a stopped position. The torque converter comprises two housing shells interconnected to retain transmission fluid. The shell on the engine side is connected to the engine through a flywheel or similar device to transmit the rotary motion of the engine crankshaft to the two shells. Pump vanes are incorporated into the shell on the transmission side of the torque converter which, when rotated by the connection to the engine, causes a toroidal flow to the oil present in the converter. The oil flow acts on a turbine, which also has corresponding vanes, to rotate the turbine. The turbine is connected to a stator which is configured to direct flow to the pump.

Since slippage always exists between the pump and turbine, which results in loss of efficiency, it is well known to supply a lock-up clutch to a torque converter to create a nonrotatable connection between the housing shells and the transmission input shaft There are examples in the prior art of the use of torque multiplier devices that employ clutches operatively connected to planetary gears in place of the torque converters described above. U.S. Pat. No. 5,836,849 to Mathiak, et al. discloses an apparatus which uses a friction clutch to transmit initial torque to an automatic transmission. Electronic controls are used to control the clutch. U.S. Pat. No. 5,846,153 to Matsuoka discloses a double clutch system with planetary gears placed between an engine and a manual transmission. The clutches are used to increase the number of gears provided to two different power paths. U.S. Pat. No. 6,406,400 to Shih discloses a planetary gear arrangement that replaces a conventional clutch and gearbox. The transmission input shaft is directly coupled to the engine by a flywheel or other convenient device. Gear shifting is performed by the electronically controlled disengagement of the clutch to allow a manual gear change maneuver. U.S. Pat. No. 6,849,024 to Hayashi, et al. discloses a clutch assembly having a starting clutch and a second clutch to transfer power to an intermediate portion of the planetary mechanism. U.S. Pat. No. 5,019,022 to Uhlig, et al. provides a speed change arrangement in which a disc brake and disc clutch are alternately engaged by a hydraulically operated toothed disc support to create two different sun gear connections—either to another planet gear to create a direct (1:1 ratio) drive power flow connection between the engine and the transmission or to the clutch housing. U.S. Pat. No. 5,628,703 discloses a flywheel-clutch arrangement for a manual gearbox in which when the clutch is engaged, the planetary gears are disengaged from the drive train. When the clutch is disengaged, the planet system is driven by the flywheel to aid synchronization. Finally, United States Patent Publication No. 2006/0016661 to George, et al., which is hereby incorporated by reference, discloses a device for producing an operative connection between an internal combustion engine and a transmission. The device is configured to be used with a wet clutch—planetary gear system and sized to easily replace, as in a drop-in, a standard torque converter.

Most of the cited references are designed to be used in conjunction with a manual transmission. As discussed above, clutch type torque multipliers are designed to promote efficiencies in power flow, and, with the exception of the '661 publication, they do not disclose a system in which the torque multiplier can easily replace a typical torque converter. Moreover, none have been disclosed as compatible with multidisplacement engines.

The operation of cylinder shut off engines also presents a unique challenge in overcoming the vibration/resonance that is created during drive train operation. As part of the drive train, the torque converter is subject to this vibration. Dampers are often employed to absorb the vibration and allow the torque converter and drivetrain to operate smoothly. However, in multidisplacement engines, two sources of vibration exist—one generated from four cylinder operation and a second generated by eight cylinder operation.

Thus, there is a need in the industry for a clutch type torque multiplier that is compatible with a multidisplacement engine and that can withstand two modes of vibration generated by two different sets of operation characteristics.

SUMMARY OF THE INVENTION

The present invention is a launch device for a motor vehicle. Torque is input from the engine and output to the transmission. Three modes of operation are possible: no torque transmission, high torque/low speed torque transmission, and pass-through torque transmission. The design is essentially a drop-in replacement for the torque converter commonly used in planetary automatic transmissions. Typically, the device will be positioned between the multidisplacement engine and the automatic transmission of the drive train. The device incorporates a planetary gear for torque multiplication and wet or dry clutches for the launch function and control of the torque ratio. This allows the launch device to provide all the functionality of a torque converter while improving both vehicle fuel economy and performance with minimal, if any, changes to currently produced planetary gear automatic transmissions. The incorporated planetary gear of the launch device provides the transmission and additional gear ratio/s, making a 4-speed transmission a 5-speed, a 5-speed transmission a 6-speed, and so on.

Specifically the present invention is a device for transferring power flow between a multidisplacement engine and a transmission comprising an enclosed housing having a first shell on the engine side and nonrotatably connected to the drive shaft/crankshaft of the engine, a second shell on the transmission side, and an axis of rotation, with the housing being at least partially filled with oil and connected to an oil pump outside the housing, an opening on the shell on the transmission side for receiving a transmission input shaft, a hub located within the housing, the hub nonrotatably connected to the transmission input shaft, a planetary gear set comprising an outer ring gear, a set of intermediate planet gears contained within a planet carrier, and a sun gear attached to a stator, a first clutch pack comprising a plurality of friction discs connecting the housing and the ring gear when engaged, a piston means designed to engage the first clutch pack, a second clutch pack comprising a plurality of friction plates, the second clutch pack connecting the ring gear with the sun gear when engaged, a preloaded diaphragm ring connecting the second clutch pack with the ring gear, a first damper spring assembly arranged between the housing and the first clutch pack, and a second damper spring assembly arranged between the sealing piston and the input shaft.

One object of the present invention is to provide a torque multiplier for use with a multi-displacement engine.

A second object of the invention is to provide a torque multiplier with a quick launch capability.

A third object of the invention is to provide a torque multiplier having a damper system that reduces vibration in both modes of operation in a multidisplacement engine.

An additional object of the invention is to provide a structure that reduces the travel distance of a clutch engagement piston.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which.

DETAILED DESCRIPTION OF THE INVENTION

Figure 1:
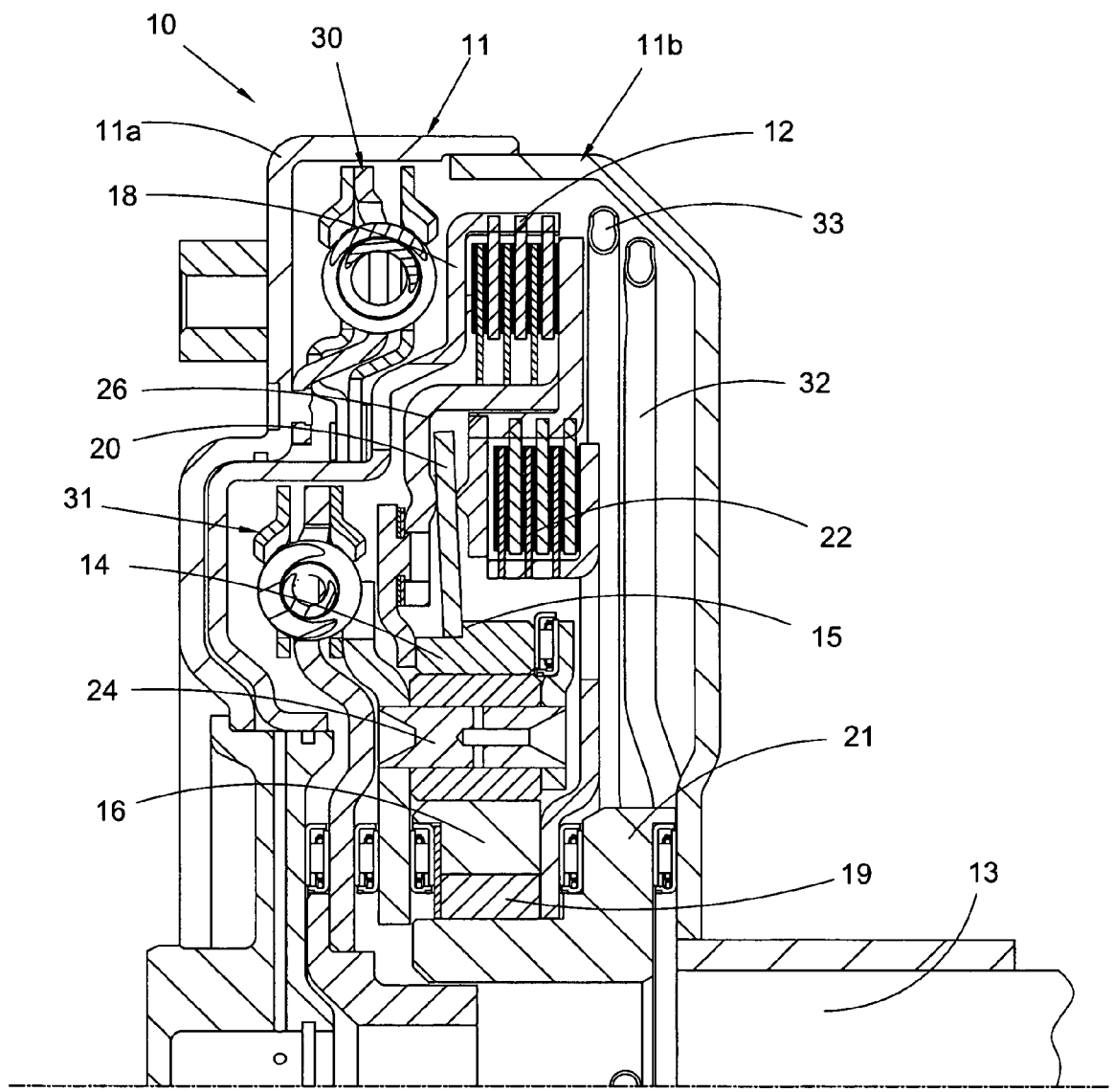
FIG. 1 is a schematic cross section of a torque converter depicting the damper system and scoop system of the present invention.

FIG. 1 depicts mechanical torque converter 10 ("device 10") including a planetary gear set and double clutch system. Housing 11 of device 10 comprises engine side shell 11a and a transmission side shell 11b sealed to retain oil that circulates within device 10. Housing 11 is nonrotatably connected with a multidisplacement engine (not shown) using a rotating disc, such as a flywheel, flex plate or similar device mounted nonrotatably on the drive shaft/crankshaft of the engine with device 10 also fixed nonrotatably on the rotating disc. The coupling may also be implemented using a flexible disc ("flexplate") with low mass. By nonrotatably is meant that housing 11 is fixedly attached to the rotating device and does not rotate freely about an axis independent of the rotation of the flywheel or driveshaft/crankshaft. These and similar nonrotatable couplings are well known to those with skill in the art.

There are two multi-plate clutch packs that connect the various components of the planetary set. Outer clutch pack (clutch) 12 connects housing 11 to ring gear 14 when engaged. Inner clutch pack (clutch) 22 connects ring gear 14 to sun gear 16 when engaged. Sun gear 16 is grounded to the stator shaft by a one-way clutch comprising sun gear 16, roller 19, and ground hub 21. Clutch 12 is a launch clutch engaged when a motor vehicle first starts from a complete or near complete stop. During launch, outer clutch pack 12 is engaged using hydraulic pressure generated by the transmission pump (not shown) which presses on sealing piston 18 to engage clutch 12. Sealing piston 18 is a typical engagement means that may be used to effect this engagement. Preloaded diaphragm spring 20 prevents the inner clutch pack 22 from engaging. The housing transmits torque to ring gear 14, through planet gears 24 to the carrier and out transmission shaft 13. Sun gear 16 is grounded with a one-way clutch so as not to rotate and the output speed is less than the input speed. Therefore, output torque is increased by the same ratio.

After launch, inner clutch pack 22 is engaged with additional hydraulic pressure. The additional hydraulic pressure overcomes the load on a preloaded diaphragm spring 20 allowing inner clutch pack 22 to engage. Ring gear 14 transmits torque to sun gear 16. Planetary gears 24 rotate with ring gear 14 and sun gear 16, so the speed differential is eliminated. Therefore, output torque and speed are the same as input torque and speed.

Diaphragm spring 20 is packaged in such a manner that it is preloaded when installed. Therefore, the travel of sealing piston 18 during engagement of outer clutch 12 is reduced because opposing plate 26 is held stationary, thereby reducing the travel required to engage outer clutch 12. Normally, sealing piston 18 would have to move the distance required to preload the diaphragm spring as well as the liftoff clearance between the clutches. When device 10 is assembled, spring 20 is placed against notch 15 on ring gear 14 and the radius of opposing plate 26 and compressed. The lower extension of opposing plate 26 is then welded to the ring gear, thereby preloading the spring. When the engagement means starts to engage, the opposing plate is held stationary until the preload force of the diaphragm spring is reached.

Diaphragm spring 20 is designed with a flat load-deflection characteristic above the preload force, so additional travel of the diaphragm spring is realized with only a small increase in force. Therefore, most of the additional pressure used to engage inner clutch pack 22 actually engages the clutch and is not opposed by the diaphragm spring.

Two dampers 30 and 31 are arranged for improved noise, vibration, and harshness control. Both dampers contain at least one spring and a controlled friction package. In a preferred embodiment, multiple coil springs may be positioned within one another. Outer damper 30 is arranged between the housing and the outer clutch pack 12. Damper 30 is connected in such a way as to allow axial movement while having the capability to transmit required torque. Damper 30 may be a two-stage type in order to be used with multiple displacement or cylinder shut-off engines. Two stage dampers generally have a first rate for a specified angle that is lower than a second rate for an additional angle. This provides improved engine torsional isolation for lower torque operation when cylinders are deactivated, but still has sufficient torque capacity for high-torque operation when all cylinders are activated.

Inner damper 31 is arranged between sealing piston 18 and transmission input shaft 13. Inner damper 31 is used when required to damp a torsional mode of the powertrain that can develop between the inertia of the ring carrier/clutch of the launch device and the effective inertia of the transmission. These two inertias oscillate out of phase with transmission input shaft 13 as the effective spring (input shaft mode). Inner damper 31 is introduced in series with the input shaft with an appropriate amount of friction to absorb the resonant energy of the torsional mode (input shaft mode).

In the launch mode or when the engine is operating in the four cylinder mode, outer damper 30 acts to absorb the generated vibration and enable the drivetrain to operate smoothly without shuddering or shaking. When inner clutch pack 22 is engaged, a new source(s) of vibration is created as the remaining engine cylinders are engaged as well as sun gear 16 and the entire planetary gearset. One source of vibration may include outer damper 30. Inner damper 31, which may be constructed similarly to outer damper 30, is configured and positioned to dampen and absorb the new vibrations generated during eight cylinder operation and enable the drivetrain to operate smoothly.

Figure 2:
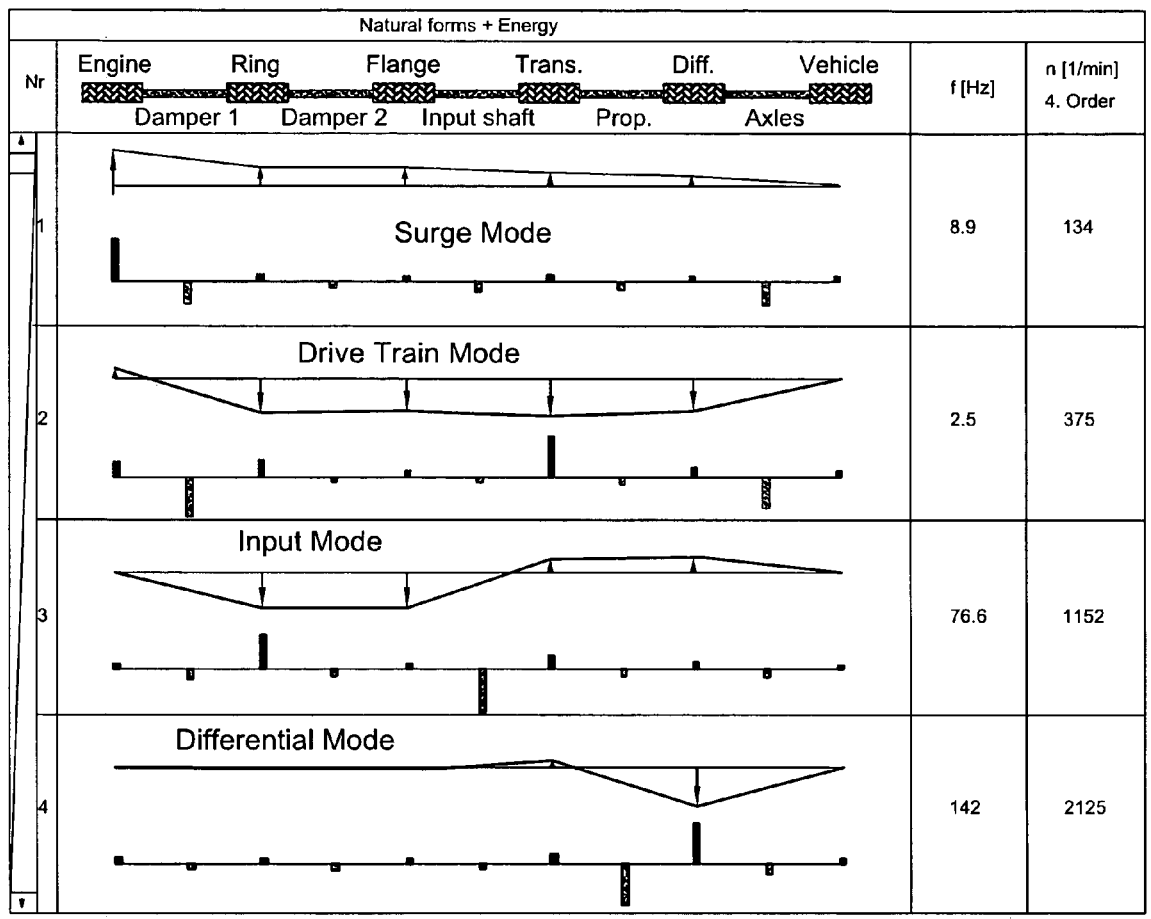
FIG. 2 is a graphical representation of the natural vibration frequencies of a typical engine drivetrain; and, FIG. 3 is a schematic cross section showing the cooling circuit of the torque converter of the present invention.

FIG. 2 is a graphical representation of the various vibration modes generated by torsional springs and inertias in a drivetrain system. Vertical lines extending below each of the horizontal lines indicates potential energy stored in damper springs or other components. Vertical lines extending above the line indicate inertia or kinetic energy produced by each component during the different phases. It can be seen that during the surge and drivetrain phases, a great deal of energy is stored in outer damper 30.

In the case of a standard displacement engine system, such as for example an eight cylinder engine, outer damper 30 may be eliminated totally allowing the envelope for the inner damper to expand. Conversely, in some applications, it would be advantageous to eliminate the inner damper and solely use the outer damper.

Two 'scoop pipes' shown on the right of FIG. 1 are used to provide cooling flow of transmission oil to the clutches. The transmission oil acts as a heat sink to absorb the heat generated by the friction absorption of the drivetrain vibration by dampers 30 and 31 as well as heat generated during engagement of the clutch packs 12 and 22 with the gearset. Scoop pipe 32 to the far right is fixed to the stator shaft and does not rotate. Scoop pipe 33 is attached to and rotates with sun gear 16 of the planetary set. Higher rotational speed of the housing and the oil inside the torque converter cause the cooling oil to be forced down the scoop pipe 32 towards the transmission input shaft.

Figure 3:
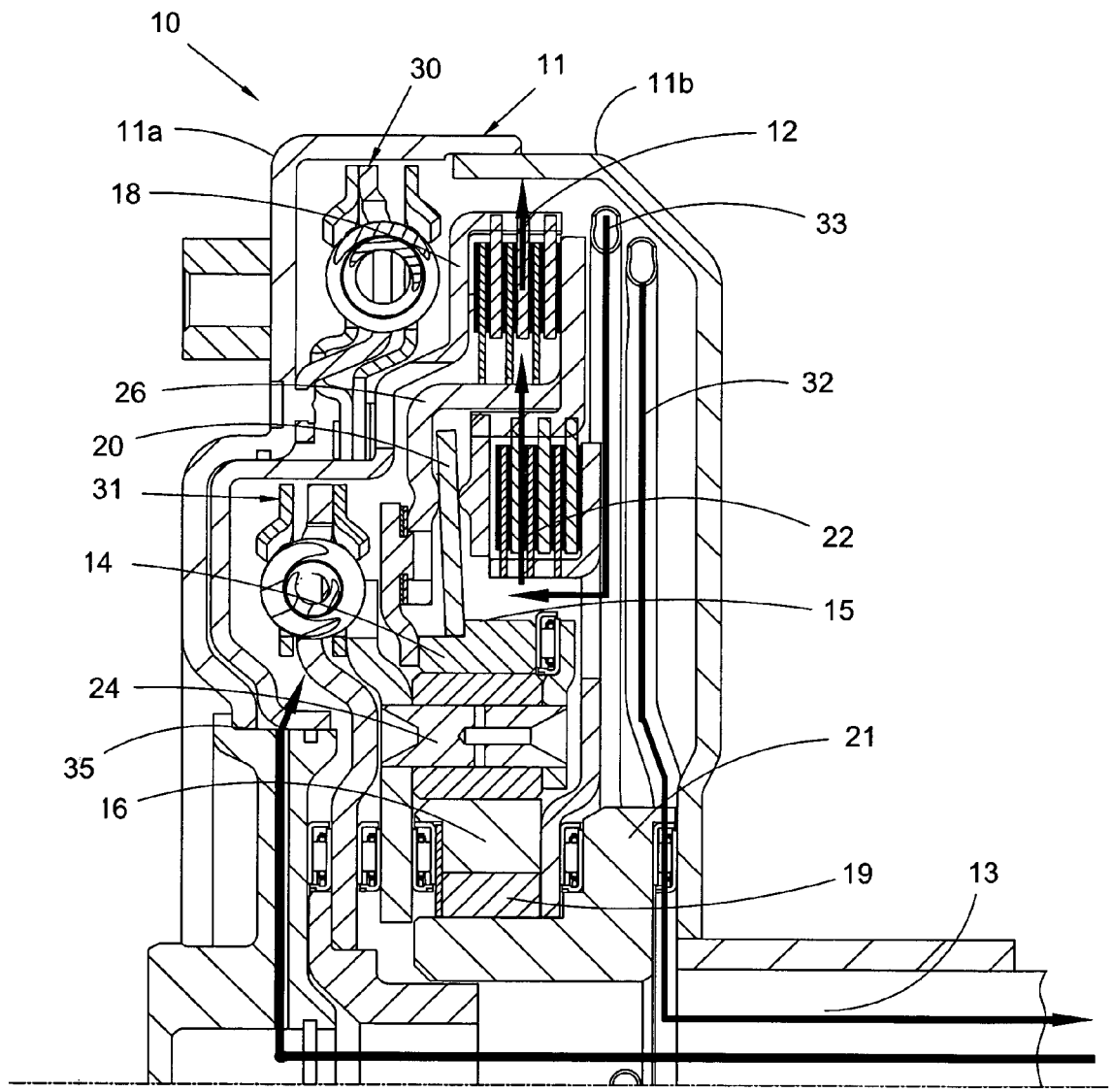

FIG. 3 depicts the flow of oil through the torque converter via scoops 32 and 33. Relatively cool oil enters the housing from transmission input shaft 13, fills the chamber of the housing and bathes dampers 30 and 31, clutch packs 12 and 22 and the other components of mechanical torque converter 10. Because scoop 33 is fixed to and rotates with sun gear 16, it does not rotate when the inner clutch is not engaged and thus picks up oil. Oil exits scoop pipe 33 at the ID and moves radially outward across clutch packs 12 and 22 to provide cooling flow. The chamber may or may not be filled with oil. Scoop pipe 32 connected to the stator shaft can be used to control the oil level in the housing as oil exits to the transmission pump. Additional cooling oil flow is provided by an orifice 35 in the piston. Once both clutches are engaged, heat generation is eliminated and scoop pipe 33 rotates at the same speed as the housing. Therefore, the pumping effect is eliminated and losses are reduced.

Thus, it is seen that the objects of the invention are efficiently obtained, although changes and modifications to the invention should be readily apparent to those having ordinary skill in the art, which changes would not depart from the spirit and scope of the invention as claimed.

We claim:

1. A device for transferring power flow between a multidisplacement engine and a transmission comprising:
   an enclosed housing having a first shell on the engine side and nonrotatably connected to the drive shaft/crankshaft of the engine, a second shell on the transmission side, and an axis of rotation, said housing being at least partially filled with oil and connected to an oil pump outside said housing;
   an opening on said second shell for receiving a transmission input shaft from said transmission;
   a hub located within said housing, said hub nonrotatably connected to said transmission input shaft;
   a planetary gear set comprising an outer ring gear, a set of intermediate planet gears contained within a planet carrier, and a sun gear attached to a stator;
   a first clutch pack comprising a plurality of friction discs connecting said housing and said ring gear when engaged;
   a piston means said piston means designed to engage said first clutch pack;
   a second clutch pack comprising a plurality of friction plates, said second clutch pack connecting said ring gear with said sun gear when engaged;
   a preloaded diaphragm spring connecting said second clutch pack with said ring gear;
   a first damper spring assembly arranged between said housing and said first clutch pack; and,
   a second damper spring assembly arranged between said piston means and said input shaft.

2. The device as recited in claim 1 further comprising a pair of scoops to provide cooling oil to said device.

3. The device as recited in claim 2 wherein said pair of scoops is located between said second housing shell and said second clutch pack.

4. The device as recited in claim 2 wherein one of said pair of scoops is attached to said sun gear.

5. The device as recited in claim 2 wherein one of said pair of scoops is fixed to said stator.

6. The device as recited in claim 1 wherein said second shell comprises at least one channel for receiving oil, said oil supplied by a pump outside said device.

7. The device as recited in claim 6 further comprising at least one outlet channel to return said oil to said pump.

8. The device as recited in claim 1 wherein to provide power flow through said device to said transmission, said driveshaft/crankshaft connection to said first shell rotates said shell thereby providing oil pressure to said piston means to engage said first clutch pack to said ring gear and said planet carrier to said input shaft.

9. The device as recited in claim 8 wherein as said oil pressure increases to overcome said preload on said diaphragm spring thereby engaging said ring gear and said sun gear and disengaging said planet carrier to provide a 1:1 ratio between said driveshaft/crankshaft rotation and said input shaft rotation.

10. The device as recited in claim 1 wherein said nonrotatable connection to the drive shaft/crankshaft includes a flywheel.

11. The device as recited in claim 1 wherein said nonrotatable connection to the drive shaft/crankshaft includes a flexplate.

12. The device as recited in claim 1 wherein said first damper includes a plurality of pairs of coil springs, one of said plurality of pairs nestled inside the second of said pair of coil springs.

13. The device as recited in claim 1 wherein said second damper includes a plurality of pairs of coil springs, one of said plurality of pairs nestled inside the second of said pair of coil springs.

14. A drive train comprising:
a multidisplacement engine;
an automatic transmission, said automatic transmission including a transmission oil pump; and,
a device for transferring power flow between the multidisplacement engine and a transmission, said device comprising:
an enclosed housing having a first shell on the engine side and nonrotatably connected to the drive shaft/crankshaft of the engine, a second shell on the transmission side, and an axis of rotation, said housing being at least partially filled with oil and connected to an oil pump outside said housing;
an opening on said second shell for receiving a transmission input shaft from said transmission;
a hub located within said housing, said hub nonrotatably connected to said transmission input shaft;
a planetary gear set comprising an outer ring gear, a set of intermediate planet gears contained within a planet carrier, and a sun gear attached to a stator;
a first clutch pack comprising a plurality of friction discs connecting said housing and said ring gear when engaged;
a piston means said piston means designed to engage said first clutch pack;
a second clutch pack comprising a plurality of friction plates, said second clutch pack connecting said ring gear with said sun gear when engaged;
a preloaded diaphragm spring connecting said second clutch pack with said ring gear;
a first damper spring assembly arranged between said housing and said first clutch pack; and
a second damper spring assembly arranged between said piston means and said input shaft.

15. The drive train as recited in claim 14 further comprising a pair of scoops to provide cooling oil to said device.

16. The drive train as recited in claim 15 wherein said pair of scoops is located between said second housing shell and said second clutch pack.

17. The drive train as recited in claim 15 wherein one of said pair of scoops is attached to said sun gear.

18. The drive train as recited in claim 15 wherein one of said pair of scoops is fixed to said stator.

19. The drive train as recited in claim 14 wherein said second shell comprises at least one channel for receiving oil, said oil supplied by a pump outside said device.

20. The drive train as recited in claim 19 further comprising at least one outlet channel to return said oil to said pump.

21. The drive train as recited in claim 14 wherein to provide power flow through said device to said transmission, said driveshaft/crankshaft connection to said first shell rotates said shell thereby providing oil pressure to said piston means to engage said first clutch pack to said ring gear and said planet carrier to said input shaft.

22. The drive train as recited in claim 21 wherein as said oil pressure increases to overcome said preload on said diaphragm spring thereby engaging said ring gear and said sun gear and disengaging said planet carrier to provide a 1:1 ratio between said driveshaft/crankshaft rotation and said input shaft rotation.

23. The drive train as recited in claim 14 wherein said nonrotatable connection to the drive shaft/crankshaft includes a flywheel.

24. The drive train as recited in claim 14 wherein said nonrotatable connection to the drive shaft/crankshaft includes a flexplate.

25. The drive train as recited in claim 14 wherein said first damper includes a plurality of pairs of coil springs, one of said plurality of pairs nestled inside the second of said pair of coil springs.

26. The drive train as recited in claim 14 wherein said second damper includes a plurality of pairs of coil springs, one of said plurality of pairs nestled inside the second of said pair of coil springs.

* * * * *